United States Patent
Lee et al.

(10) Patent No.: US 8,249,363 B2
(45) Date of Patent: Aug. 21, 2012

(54) IMAGE COMPARISON SYSTEM AND METHOD

(75) Inventors: Chung-I Lee, Taipei Hsien (TW); Chien-Fa Yeh, Taipei Hsien (TW); Wei-Qing Xiao, Shenzhen (CN)

(73) Assignees: Hong Fu Jin Precision Industry (ShenZhen) Co., Ltd., Shenzhen, Guangdong Province (CN); Hon Hai Precision Indsutry Co., Ltd., Tu-Cheng, New Taipei (TW)

( * ) Notice: Subject to any disclaimer, the term of this patent is extended or adjusted under 35 U.S.C. 154(b) by 368 days.

(21) Appl. No.: 12/617,884

(22) Filed: Nov. 13, 2009

(65) Prior Publication Data
US 2010/0158393 A1   Jun. 24, 2010

(30) Foreign Application Priority Data
Dec. 19, 2008   (CN) .......................... 2008 1 0306395

(51) Int. Cl.
*G06K 9/68* (2006.01)

(52) U.S. Cl. ...................................................... 382/218

(58) Field of Classification Search ........................ None
See application file for complete search history.

(56) References Cited

U.S. PATENT DOCUMENTS

| | | | | |
|---|---|---|---|---|
| 4,853,967 A | * | 8/1989 | Mandeville | 382/147 |
| 5,129,009 A | * | 7/1992 | Lebeau | 382/149 |
| 5,452,368 A | * | 9/1995 | LeBeau | 382/145 |
| 7,031,501 B2 | * | 4/2006 | Adachi et al. | 382/124 |
| 2005/0063596 A1 | * | 3/2005 | Yomdin et al. | 382/232 |

* cited by examiner

*Primary Examiner* — Chan S Park
*Assistant Examiner* — Elisa Rice
(74) *Attorney, Agent, or Firm* — Altis Law Group, Inc.

(57) ABSTRACT

An image comparison method compares a reference image with a test image. Each image includes objects and a background. The method generates a skeleton image of the reference image. The skeleton image of the reference image is compared with the test image so as to determine if the reference image have more objects or objects parts than the test image. Similarly, a skeleton image of the test image is generated. The skeleton image of the test image is compared with the reference image so as to determine if the test image have more objects or objects parts than the reference image.

15 Claims, 5 Drawing Sheets

IMAGE COMPARISON SYSTEM AND METHOD

BACKGROUND

1. Technical Field

Embodiments of the present disclosure relate to image processing, and particularly to an image comparison system and method.

2. Description of Related Art

One of the simplest methods of image comparison is to compare pixel values of an image to pixel values of another image. However, sometimes, a user is only interested in objects in images and wants to ignore minor differences between the images. In this case, the method to compare pixel values of each pixel of two images may be improper.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
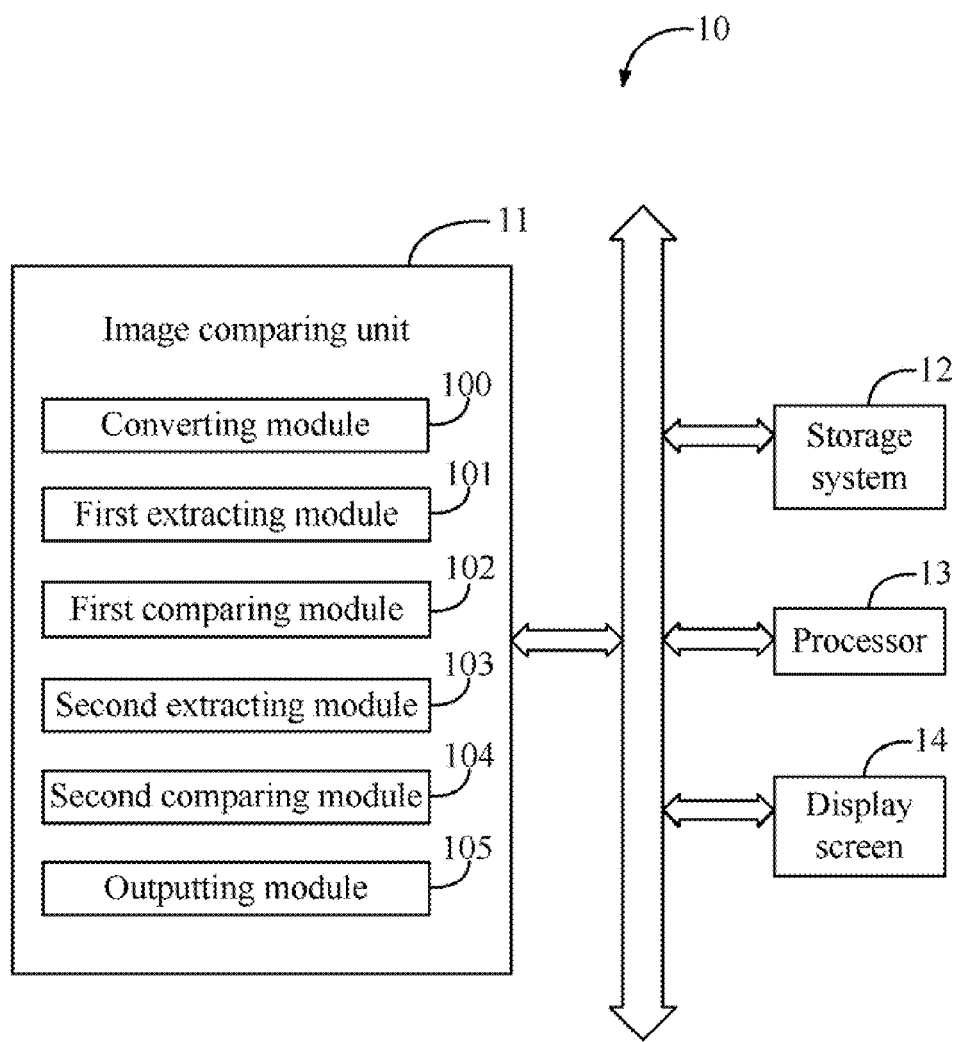
FIG. 1 is a block diagram of one embodiment of an image comparison system.

FIG. 1 is a block diagram of one embodiment of an image comparison system 10. In one embodiment, the image comparison system 10 may be a data processing device or a computerized device that can process digital images, such as a personal computer, an application server, or a workstation, for example. In the embodiment, the image compassion system 10 includes an image comparing unit 11, a storage system 12, a processor 13, and a display screen 14. The image comparing unit 11 includes a plurality of function modules which are used to identify difference between a reference image and a test image. The storage system 12 may store the reference image, the test image, and computerized codes of the image comparing unit 11. In one embodiment, the storage system 12 may be a memory, a hard disk, or a compact disk. The processor 13 executes the function modules of the image comparing unit 11. The display screen 14 provides a user interface to display the reference image and the test image.

In one embodiment, the image comparing unit 11 may include a converting module 100, a first extracting module 101, a first comparing module 102, a second extracting module 103, a second comparing module 104, and an outputting module 105.

Figure 3:
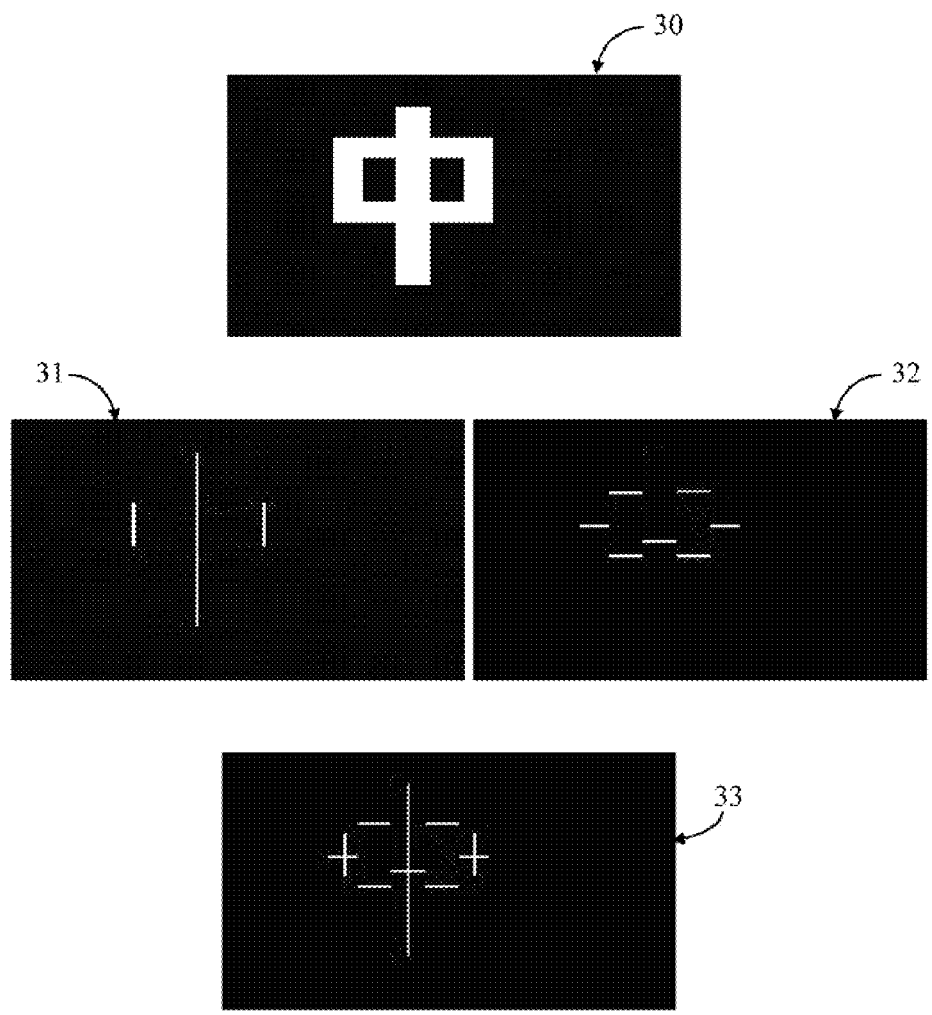
FIG. 3 illustrates one embodiment of a monochrome image and a skeleton image derived from the monochrome image.

The converting module 100 is operable to convert the reference image into a monochrome reference image, and convert the test image into a monochrome test image. In one embodiment, the reference image and the test image are color images. A monochrome image may only include two colors of black and white. In the monochrome image, objects are white and background is black, or the objects are black and the background is white. FIG. 3 illustrates one embodiment of a monochrome image 30 and a skeleton image 33 derived from the monochrome image 30, where the object, namely a Chinese character "中," is white, and the background is black. It is easier to distinguish objects and the background in a monochrome image than a color image. In one embodiment, the converting module 100 firstly converts the color images into gray images, and converts the gray images into the monochrome images.

The first extracting module 101 is operable to extract a skeletal frame of the objects in the monochrome reference image to generate a skeleton image of the reference image. It may be understood that objects in an image may be contents in the image, such as Chinese characters, English letters, a tree, a dog, or a cloud. In one embodiment, the monochrome reference image is represented as a matrix comprising lines and columns. The first extracting module 101 may update pixel values in each line of the monochrome reference image to obtain a line skeleton image of the reference image. The first extracting module 101 may further update pixel values in each column of the monochrome reference image to obtain a column skeleton image of the reference image. Finally, the first extracting module 101 generates the skeleton image of the monochrome reference image by integrating the line skeleton image and the column skeleton image. In one example with respect to FIG. 3, a line skeleton image 31 and a column skeleton image 32 are derived from the monochrome image 30, and a skeleton image 33 is generated according to the line skeleton image 31 and the column skeleton image 32. Further details of generating a skeleton image are described in paragraphs below.

Figure 4:
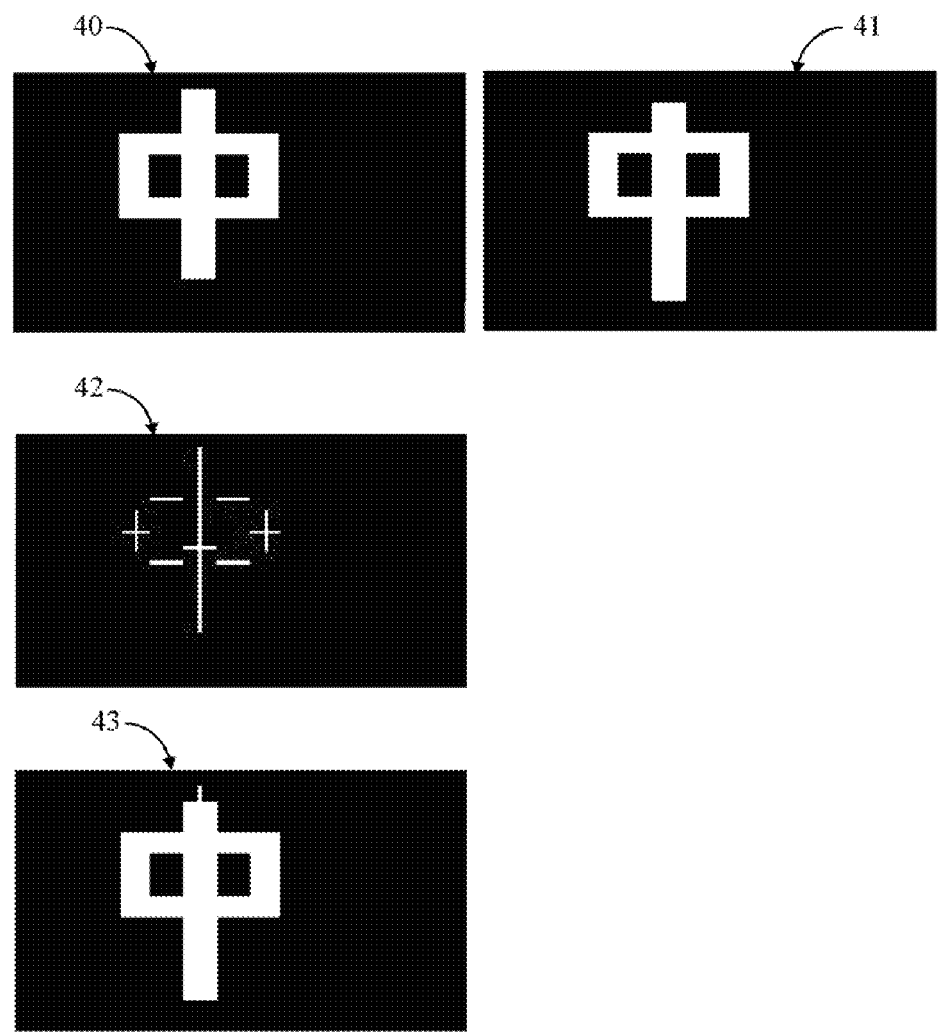
FIG. 4 illustrates one embodiment of comparing a skeleton image of a reference image with a monochrome test image.

The first comparing module 102 is operable to compare the skeleton image of the reference image with the monochrome test image so as to generate a first comparison image. In one example with respect to FIG. 4, a skeleton image 42 is derived from a monochrome reference image 40. The skeleton image 42 is compared with a monochrome test image 41 so as to obtain a first comparison image 44. FIG. 4 shows that the monochrome reference image 40 have more objects (or object parts) than the monochrome test image 41. It may be understood that the first comparison image 44 may be same as the monochrome test image 41 if the monochrome reference image 40 have no more objects(or object parts) than the monochrome test image 41.

The second extracting module 103 is operable to extract a skeletal frame of the objects in the monochrome test image to generate a skeleton image of the test image. In one embodiment, similar to the first comparing module 101, the second comparing module 103 updates pixel values in each line of the monochrome test image to obtain a line skeleton image of the test image, and updates pixel values in each column of the monochrome test image to obtain a column skeleton image of the test image. The skeleton image of the test image is generated by integrating the line skeleton image and the column skeleton image of the test image.

Figure 5:
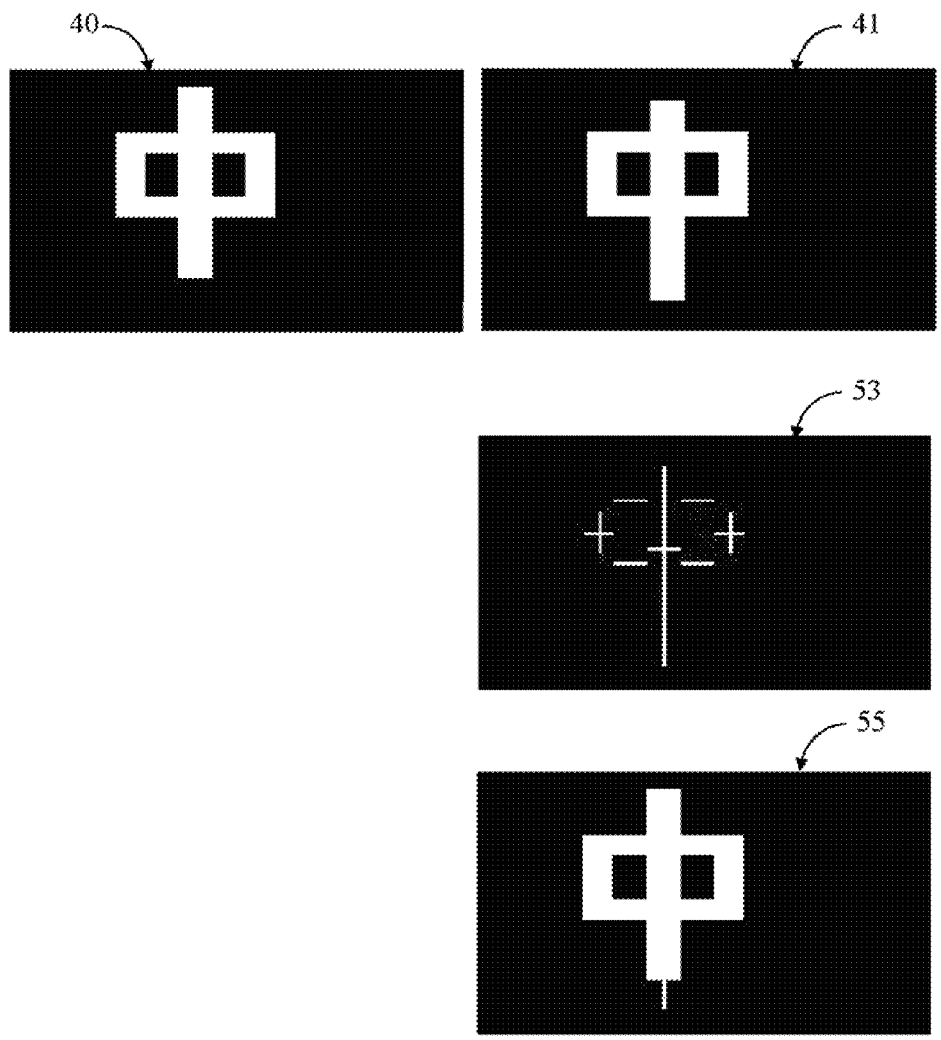
FIG. 5 illustrates one embodiment of comparing a skeleton image of a test image with a monochrome reference image.

The second comparing module 104 is operable to compare the skeleton image of the test image with the monochrome reference image so as to generate a second comparison image. In one example with respect to FIG. 5, a skeleton image 53 is derived from the monochrome test image 41. The skeleton image 53 is compared with the monochrome reference image 40 so as to obtain a second comparison image 55. FIG. 5 shows that the monochrome test image 41 have more objects (or object parts) than the monochrome reference image 40. It may be understood that the second comparison image 55 may be same as the monochrome reference image 40 if the monochrome test image 41 have no more objects (or object parts) than the monochrome reference image 40.

The outputting module 105 is operable to output the first comparison image and the second comparison image. The outputting module 105 may output the result image to an output device, such as the display screen 14.

Figure 2:
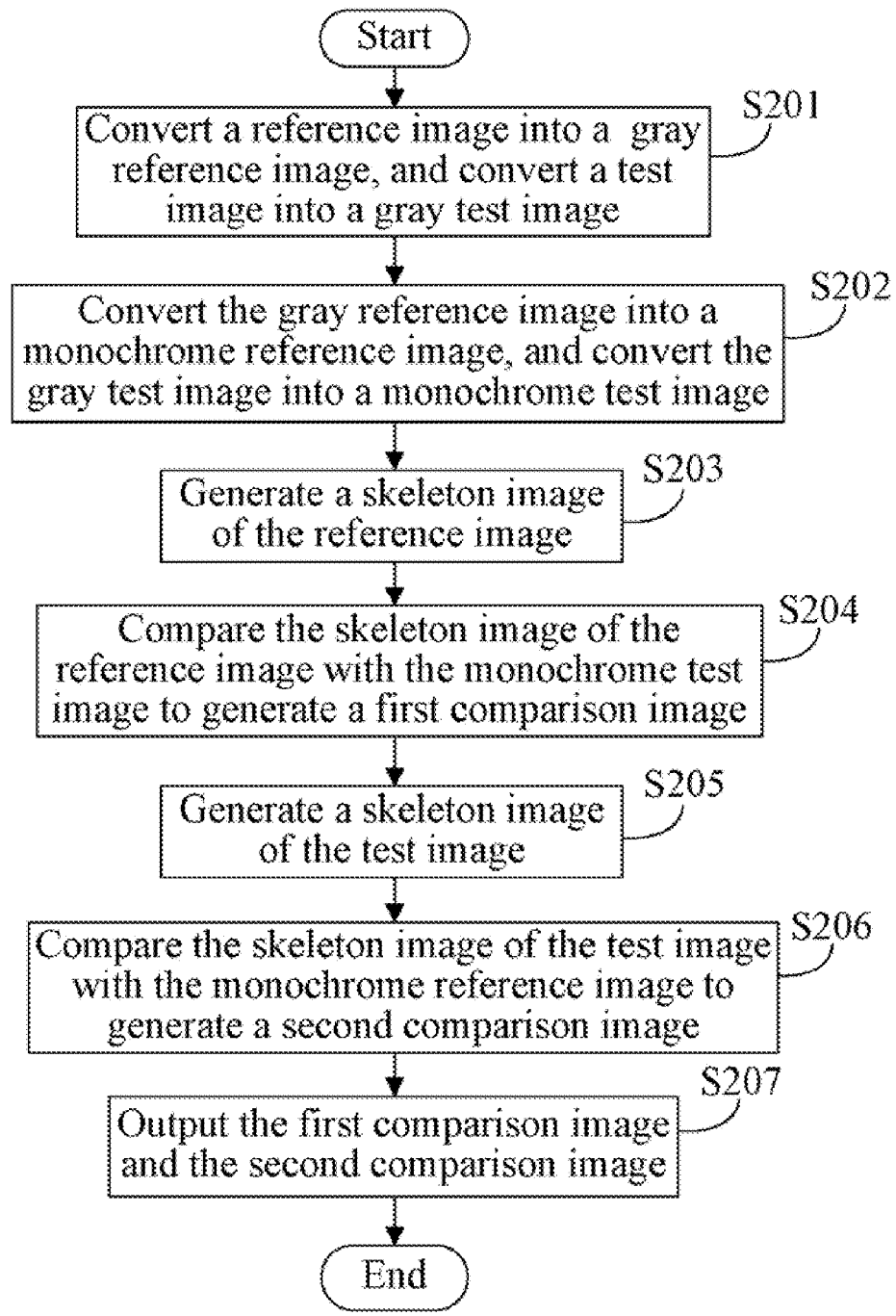
FIG. 2 is a flowchart of one embodiment of an image comparison method.

FIG. 2 is a flowchart of one embodiment of an image comparison method. The method may identify difference between a reference image and a test image. In the illustrative embodiment, the reference image and the test image are color images. Depending on the embodiments, additional blocks may be added, others removed, and the ordering of the blocks may be changed.

In block S201, the converting module 100 converts the reference image into a gray reference image, and converts the test image into a gray test image. In one embodiment, the converting module 100 converts a color image into a gray image by computing a gray value of each pixel of the color image using a converting formula. In one embodiment, the converting formula may be as follows: gray value=R*0.3+ G*0.59+B*0.11, wherein R, G, and B respectively represent a red component value, a green component value, and a blue component value of a pixel of the color image.

In block S202, the converting module 100 converts the gray reference image into a monochrome reference image, and converts the gray test image into a monochrome test image. In one embodiment, a monochrome image only includes two colors of black and white. The pixel value of "1" represents black and the pixel value of "0" represents white. In the monochrome image, objects are white and background is black, or the objects are black and the background is white. In one example with respect to FIG. 3, the object in a monochrome image 30, namely a Chinese character "中," is white, and the background is black.

The converting module 100 may convert a gray image into a monochrome image by comparing a gray value of each pixel of the gray image with a threshold value, such as 127, for example. In one embodiment, if a gray value of a pixel is more than or equal to the threshold value, the pixel value is changed to "1." Otherwise, if the gray value of the pixel is less than the threshold value, the pixel value is changed to "0."

In block S203, the first extracting module 101 extracts a skeletal frame of the objects in the monochrome reference image to generate a skeleton image of the reference image. In one embodiment, each of the pixel values is "0" or "1." Thus, the pixel values of the background are "0" and the pixel values of the objects are "1," if the objects are white and the background is black in the monochrome reference image.

In one embodiment, the first extracting module 101 searches the pixel values of the objects in each row of the monochrome reference image to obtain a plurality of line groups that include consecutive pixel values of the objects. In one example, if the pixel values of all pixels in a row of the monochrome reference image are "1, 1, 1, 0, 0, 1, 1, 1, 1, 1, 0, 0, 1," the first extracting module 101 can obtain two line groups including "1, 1, 1" and "1, 1, 1, 1, 1." The first extracting module 101 updates the pixel values in each of the line groups by maintaining a central pixel value and changing the other pixel values. As such, a line skeleton image of the test image is obtained. In one example, the pixel values in each of the line groups excepting the central pixel value are changed from "1" to "0." Thus, the pixel values in the two line groups are updated to "0, 1, 0" and "0, 0, 1, 0, 0." Accordingly, in the example, the pixel values of all pixels in the row are changed to "0, 1, 0, 0, 0, 0, 0, 1, 0, 0, 0, 0, 1." In one example with respect to FIG. 3, a line skeleton image 31 is derived from the monochrome image 30.

Similarly, the first extracting module 101 obtains column groups that include consecutive pixel values of the objects in each column of the monochrome reference image, and updates the pixel values in each of the column groups. As such, a column skeleton image of the test image is obtained. In one example with respect to FIG. 3, a column skeleton image 32 is derived from the monochrome image 30. The first extracting module 101 integrates the line skeleton image and the column skeleton image of the reference image to generate the skeleton image of the reference image. In one example with respect to FIG. 3, a skeleton image 33 is generated by integrating the line skeleton image 31 and the column skeleton image 32.

In block S204, the first comparing module 102 compares the skeleton image of the reference image with the monochrome test image so as to generate a first comparison image. As mentioned above, the first comparison image may indicate that if the reference image have more objects (or object parts) than the test image. In one embodiment, the first comparing module 102 marks the more objects (or object parts) of the reference image than the test image in a first color, such as red.

In block S205, the second comparing module 103 extracts a skeletal frame of the objects in the monochrome test image to generate a skeleton image of the test image. In one embodiment, the second comparing module 103 generates the skeleton image of the test image using the method as described in block S203.

In block S206, the second comparing module 104 compares the skeleton image of the test image with the monochrome reference image so as to generate a second comparison image. As mentioned above, the second comparison image may indicate that if the test image have more objects (or object parts) than the reference image. In one embodiment, the second comparing module 104 marks the more objects (or object parts) of the test image than the reference image in a second color, such as blue.

In block S207, the outputting module 105 outputs the first comparison image and the second comparison image. In one embodiment, the outputting module 105 may display the result image on the display screen 14 of the image comparison system 10.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image comparison system, comprising:
a storage system;
at least one processor; and
an image comparing unit stored in the storage system and executable by the at least one processor, the image comparing unit comprising:
a first extracting module operable to extract a skeletal frame of objects in a reference image to generate a skeleton image of the reference image;
a first comparing module operable to compare the skeleton image of the reference image with a test image so as to generate a first comparison image, the first comparison image indicating if the reference image have more objects or objects parts than the test image;
a second extracting module operable to extract a skeletal frame of the objects in the test image to generate a skeleton image of the test image;
a second comparing module operable to compare the skeleton image of the test image with the reference image so as to generate a second comparison image, the second comparison image indicating that if the test image have more objects or objects parts than the reference image; and an outputting module operable to display the first comparison image and the second comparison image on a display screen of the image comparison system.

2. The image comparison system of claim 1, further comprising:
a converting module operable to convert the reference image and the test image into monochrome images if the reference image and the test image are color images.

3. The image comparison system of claim 2, wherein the converting module first converts the color images into gray images, and converts the gray images into the monochrome images.

4. The image comparison system of claim 1, wherein the first extracting module updates pixel values in each line of the reference image to obtain a line skeleton image of the reference image, updates pixel values in each column of the reference image to obtain a column skeleton image of the reference image, and generates the skeleton image of the reference image by integrating the line skeleton image and the column skeleton image.

5. The image comparison system of claim 1, wherein the second comparing module updates pixel values in each line of the test image to obtain a line skeleton image of the test image, updates pixel values in each column of the test image to obtain a column skeleton image of the test image, and generates the skeleton image of the test image by integrating the line skeleton image and the column skeleton image.

6. An image comparison method implemented by a computerized device, the method comprising:
extracting a skeletal frame of objects in a reference image to generate a skeleton image of the reference image;
comparing the skeleton image of the reference image with a test image so as to generate a first comparison image, the first comparison image indicating if the reference image have more objects or objects parts than the test image;
extracting a skeletal frame of the objects in the test image to generate a skeleton image of the test image;
comparing the skeleton image of the test image with the reference image so as to generate a second comparison image, the second comparison image indicating that if the test image have more objects or objects parts than the reference image; and
displaying the first comparison image and the second comparison image on a display screen of the computerized device.

7. The image comparison method of claim 6, further comprising:
converting the reference image and the test image into monochrome images if the reference image and the test image are color images.

8. The image comparison method of claim 7, wherein the color images are first converted into gray images, and the gray images are converted into the monochrome images.

9. The image comparison method of claim 6, wherein the skeleton image of the reference image is generated as follow:
updating pixel values in each line of the reference image to obtain a line skeleton image of the reference image;
updating pixel values in each column of the reference image to obtain a column skeleton image of the reference image; and
integrating the line skeleton image and the column skeleton image to generate the skeleton image of the reference image.

10. The image comparison method of claim 6, wherein the skeleton image of the test image is generated as follow:
updating pixel values in each line of the test image to obtain a line skeleton image of the test image;
updating pixel values in each column of the test image to obtain a column skeleton image of the test image; and
integrating the line skeleton image and the column skeleton image to generate the skeleton image of the test image.

11. A non-transitory computer-readable medium having stored thereon instructions that, when executed by a processor of a computerized device, cause the computerized device to execute an image comparison method, the method comprising:
extracting a skeletal frame of objects in a reference image to generate a skeleton image of the reference image;
comparing the skeleton image of the reference image with a test image so as to generate a first comparison image, the first comparison image indicating if the reference image have more objects or objects parts than the test image;
extracting a skeletal frame of the objects in the test image to generate a skeleton image of the test image;
comparing the skeleton image of the test image with the reference image so as to generate a second comparison image, the second comparison image indicating that if the test image have more objects or objects parts than the reference image; and
displaying the first comparison image and the second comparison image on a display screen of the computerized device.

12. The computer-readable medium of claim 11, wherein the method further comprises:
converting the reference image and the test image into monochrome images if the reference image and the test image are color images.

13. The computer-readable medium of claim 12, wherein the color images are first converted into gray images, and the gray images are converted into the monochrome images.

14. The computer-readable medium of claim 11, wherein the skeleton image of the reference image is generated as follow:
updating pixel values in each line of the reference image to obtain a line skeleton image of the reference image;
updating pixel values in each column of the reference image to obtain a column skeleton image of the reference image; and
integrating the line skeleton image and the column skeleton image to generate the skeleton image of the reference image.

15. The computer-readable medium of claim 11, wherein the skeleton image of the test image is generated as follow:
updating pixel values in each line of the test image to obtain a line skeleton image of the test image;
updating pixel values in each column of the test image to obtain a column skeleton image of the test image; and
integrating the line skeleton image and the column skeleton image to generate the skeleton image of the test image.

* * * * *